July 11, 1967  D. F. SCHLUETER  3,330,402
CONTAINER HANDLING APPARATUS
Filed July 8, 1966  2 Sheets-Sheet 1

INVENTOR.
David F. Schlueter
BY
His Att'ys

July 11, 1967 D. F. SCHLUETER 3,330,402
CONTAINER HANDLING APPARATUS
Filed July 8, 1966 2 Sheets-Sheet 2
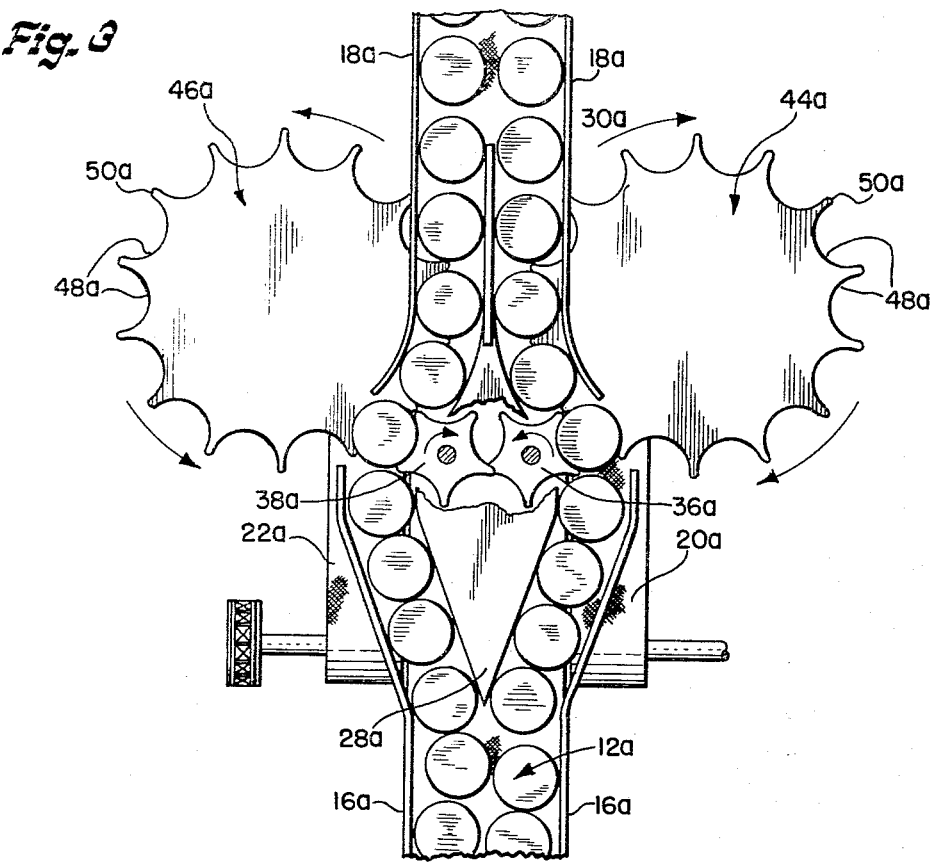
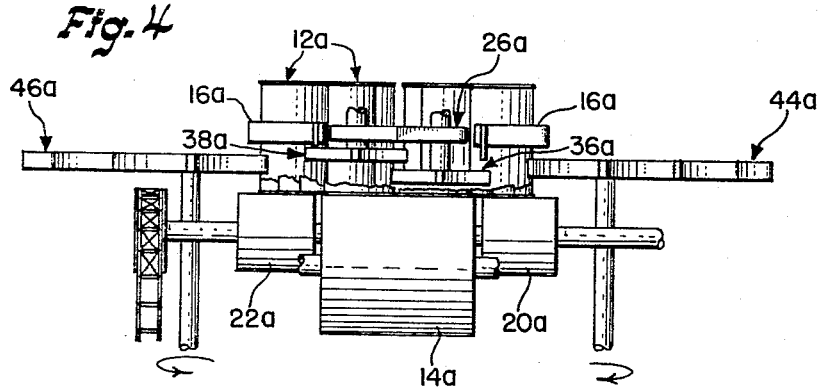
INVENTOR.
David F. Schlueter
BY
Michael Frye
Robert W. Beart
His Att'ys

United States Patent Office 3,330,402
Patented July 11, 1967

---

3,330,402
CONTAINER HANDLING APPARATUS
David F. Schlueter, Hoopeston, Ill., assignor to Illinois Tool Works Inc., Chicago, Ill., a corporation of Delaware
Filed July 8, 1966, Ser. No. 563,901
7 Claims. (Cl. 198—30)

ABSTRACT OF THE DISCLOSURE

Container handling equipment for receiving a procession of containers moving in a disorganized array or procession, and discharging the containers in a double file procession traveling two abreast.

---

There are a number of container handling systems for converting a single file procession or randomly positioned double file procession of containers into a double file procession of containers traveling two abreast. Examples of such systems are shown in U.S. Patents Nos. 3,032,944 and 3,204,386, assigned to the same assignee of the present invention. As shown in these patents, such container handling systems have been usefully employed in the multi-packaging industry where it is desired to combine or assemble a plurality of containers together as a container package.

The present invention is an improved version of the container handling systems such as disclosed in the aforementioned patents as will be apparent from the discussion that is to follow.

One object of the present invention is to provide an improved container handling system which converts a single file procession or randomly positioned double file procession of containers into a double file procession of containers traveling two abreast.

More particularly, it is an object of the present invention to provide a container handling system which provides effective control and handling of containers in the aforementioned manner without complicated, expensive apparatus.

Another object of the present invention is to provide a container handling system which is capable of operating in a fast and efficient manner and in a reliable fashion over a prolonged period.

Yet another object of the present invention is the provision of a container handling system which is made of a minimum number of parts and provides economy in operation by reducing operating efficiencies caused by wearing of parts.

These and other objects and advantages of the present invention are obtained by a container handling apparatus which transforms a randomly positioned procession of containers into a double file procession of containers traveling two abreast through the medium of a first conveyor means which receives and transports incoming containers along a predetermined path, second and third conveyor means positioned adjacent the first conveyor means to receive containers from said first conveyor means, container separator means which directs the containers received by the first conveyor means onto the second and third conveyor means, and means for correlating the speed and spacing of each group of containers on the second and third conveyor means and for thereafter returning the correlated containers to the first conveyor means in closely spaced groups of containers traveling two abreast.

Figure 1:
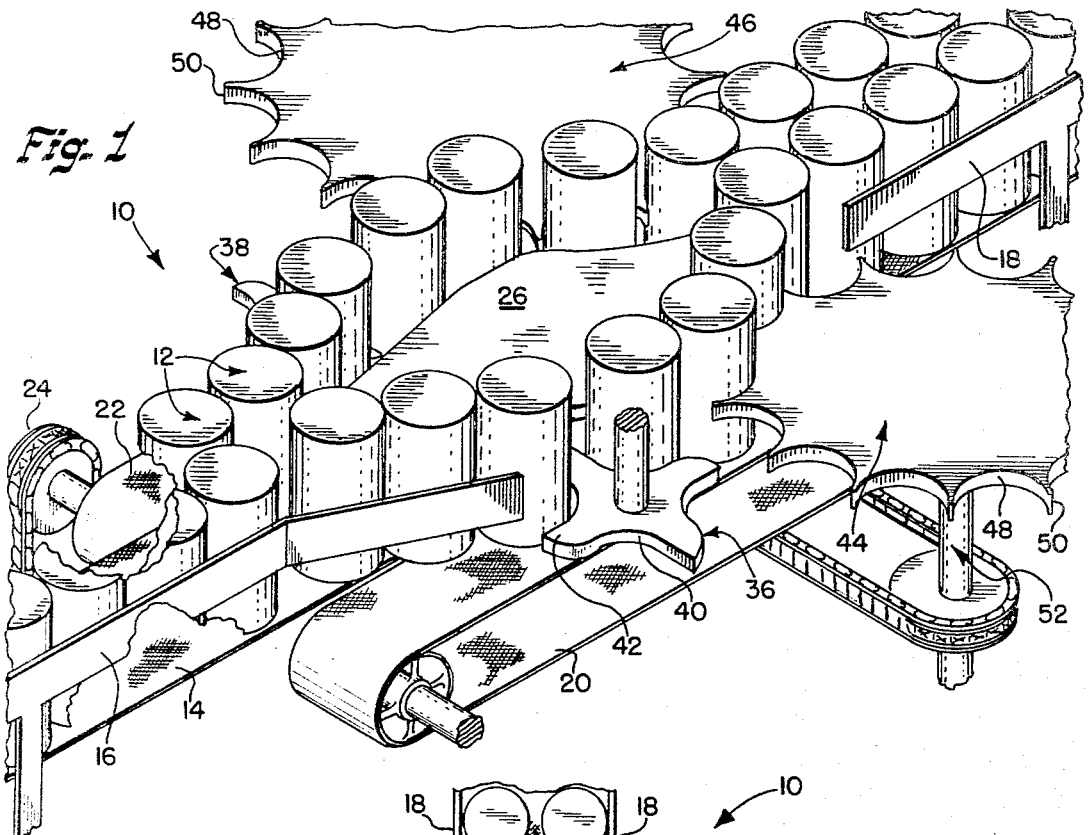
Figure 2:
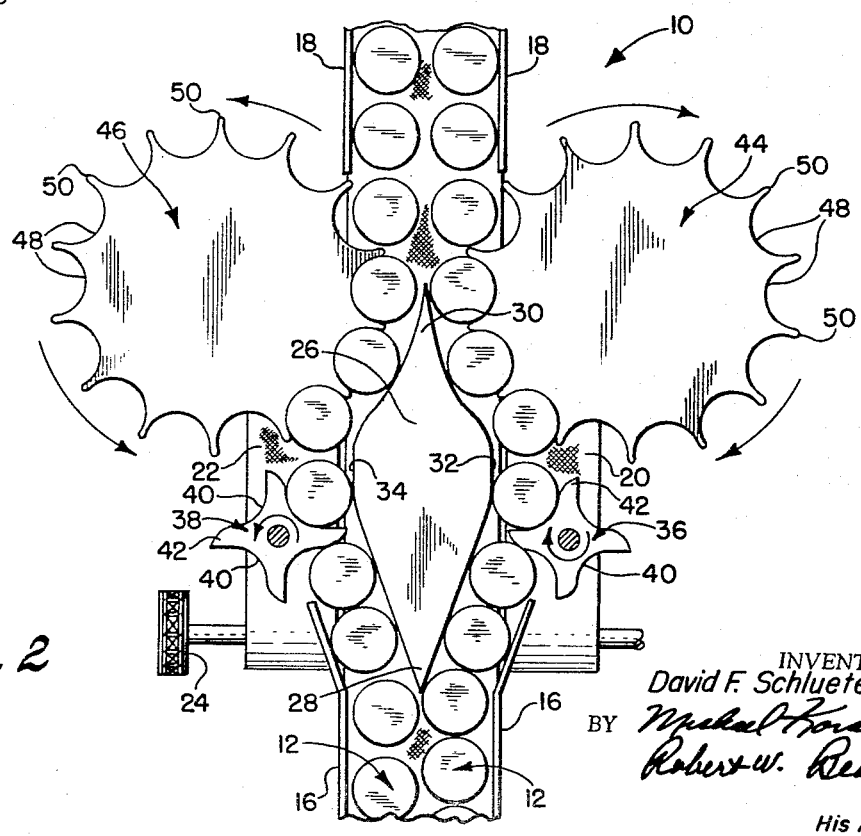

Reference is now made to the drawings wherein:
FIG. 1 is a fragmentary perspective view illustrating the container handling apparatus constructed in accordance with the teachings of the present invention;
FIG. 2 is a top plan view of the container handling apparatus shown in FIG. 1, but on a smaller scale;
FIG. 3 is a top plan view showing a modified form of the invention; and
FIG. 4 is a side elevational view of the modified apparatus depicted in FIG. 3.

While the container handling apparatus of the present invention is designed primarily for use in the multi-packaging industry where a plurality of containers are assembled together as a container package, it can, of course, be used in any other instance where it is desired to rapidly convert a single file procession or randomly positioned double file procession of containers into closely spaced groups of containers traveling two abreast.

The containers illustrated in the drawings and described herein, are of the sheet metal variety commonly employed in the can industry; however, it is to be understood that the term "containers" as used herein, is intended to cover articles or objects of various shapes and sizes which are capable of being handled and arranged in the manner contemplated by the present invention.

The container handling apparatus 10 shown in the drawings is designed, for example, to accept the output of cans or containers from high-speed container filling and closing equipment such as presently in use in the packaging industry. Conventional canning equipment is capable of issuing filled containers, usually in excess of 1,000 cans per minute. In view of this high-speed performance of conventional canning equipment, it is necessary that the container handling system used in connection therewith have the capability of rapidly accepting and arranging the containers in the manner desired. Otherwise, the production line of the canning equipment will be greatly hampered resulting in shutdowns with consequent loss of time and greater expense.

In the usual case the cans issuing from the container filling and closing equipment are in a slightly staggered or laterally offset single file procession of containers, but there are instances where containers may emanate from such equipment in a randomly positioned, double file procession of containers. This is undesirable in container package forming machinery and the like where it is necessary to arrange containers in closely spaced groups traveling two abreast for multi-packaging in various packaging units of two or more containers. Accordingly, it is necessary to employ a container handling system such as the apparatus 10 for achieving the desired conversion.

The apparatus 10 receives containers 12 at the left-hand side of the apparatus shown in FIG. 1 and at the lower portion of the FIG. 2 illustration. The incoming procession of containers 12 are shown in the drawing as being arranged in a randomly positioned, double file procession, it being understood that in some cases, the containers will emanate from a container filling and closing machine in a single file procession. The containers 12 are received and carried by a suitable infeed conveyor 14 which is only partially shown in the drawing, but preferably comprises an endless belt driven by suitable mechanisms (not shown) such as a chain-sprocket drive mechanism or the like. The conveyor 14 may either be directly attached to the container filling and closing equipment or form part of the carrier applicating equipment. Whichever the case, the conveyor 14 should be driven at a speed at least equal to the speed of the containers issuing from the container filling and closing equipment to avoid impeding the operation of the container filling and closing equipment.

Container guides in the form of side rails 16, 18 are used in conjunction with the conveyor 14 at the infeed and outfeed stations to prevent falling of containers.

Second and third conveyors 20, 22, also in the form of endless belts, are positioned on opposite sides of the first conveyor 14. These belts are driven at the same speed by a suitable chain-sprocket mechanism 24 which is partially illustrated in the drawing. The second and third conveyors 20, 22 are preferably driven by the chain-sprocket mechanism 24 at a speed exceeding the first conveyor 14 for reasons which will be made apparent hereinafter.

As illustrated in FIG. 1 of the drawing, the second and third conveyors 20, 22 are smaller than the first conveyor 14 in both length and width, and this will be understood when it is recognized that the second and third conveyors 20, 22 are used solely for the purpose of transporting a single file procession of containers received thereby. Each of the second and third conveyors 20, 22 are positioned closely adjacent to the first conveyor 14 with the upper run thereof in coplanar relationship with the conveyor 14 to permit lateral transfer of containers from and back to the first conveyor 14 as will presently be discussed.

The containers 12, whether in a single file procession or randomly positioned double file procession, are transferred to the second and third conveyors 20, 22 by the container separator 26 which is in the form of a fixed plate element positioned directly above the conveyor 14. The container separator 26 intercepts containers 12 transported by the conveyor 14 and directs them to the second and third conveyors 20, 22. As best seen in FIG. 2 of the drawing, the container separator 26 is generally a diamond shaped element having first and second tapered nose portions, 28, 30 longitudinally aligned with the conveyor 14, and rounded end portions 32, 34 which are positioned substantially transversely of the conveyor 14. The sides of the generally diamond shaped container separator 26 between the tapered nose portion 28 and the rounded end portion 32 may be either straight or slightly curved inwardly whereas the sides of the container separator intermediate the tapered nose portion 30 and the rounded end portions 32, 34 are preferably curved inwardly as shown for cooperation with the container timing elements as will be discussed hereafter.

The generally diamond shaped container separator 26 is located centrally of the conveyor 14 so that an imaginary longitudinal line subdividing the conveyor 14 into two equal segments also bisects the included angle of the tapered end nose portions 28, 30. The tapered nose portions 28, 30 are positioned at the inlet and outlet stations respectively of the container handling apparatus 10, to direct containers from and return them to the conveyor 14.

The tapered nose portion 28 at the inlet station of the container handling apparatus, because of its central positionment, directs containers 12 moving on the conveyor 14 to the conveyors 20, 22 as illustrated in the drawing. As the containers 12 are moved onto the second and third conveyors 20, 22 respectively, they are guided by the side rails 16 until a respective container reaches the rotating gate mechanism 36, 38 used in conjunction with the second and third conveyors 20, 22 respectively. Each of the rotating gate mechanisms 36, 38 comprises an idler star wheel having a plurality of curvilinear pockets 40 which are complementary to the outer cylindrical configuration of the container 12. It will be understood that the pockets 40 will take the shape of the articles or objects engaged thereby so as to avoid damage, jam-ups and the like. While any suitable number of pockets 40 may be employed, for purposes of the present disclosure, it will be noted that there are some four curvilinear pockets 40 provided on each idler star wheel 36, 38.

The idler star wheels 36, 38 are designed to receive the containers 12 and permit their passage only if there is not a fillup of containers immediately beyond. For this purpose, each of the idler star wheels 36, 38 are positioned above the conveyor with which it is associated and so located with respect to the container separator 26 that the star teeth 42 of each star wheel 36, 38 are capable of being projected into the moving path of containers 12 as they are moved onto the second and third conveyors 20, 22. The idler star wheels merely serve, therefore, as a gate mechanism which is governed by the line speed of the containers 12. In this respect, they do serve an important purpose in preventing container damage and assuring smooth, continuous transfer of containers when in operation.

The conveyors 20, 22, as previously mentioned, are preferably driven at a speed exceeding that of the conveyor 14. This is not only for the purpose of relieving line congestion to the rear of the container handling apparatus, but also for assuring removal of containers 12 from the conveyor 14 so that the second and third conveyors 20, 22 respectively can readily accommodate containers without line jam-up. The driven character of the conveyors 20, 22 reduces wear which has been a problem with the stationary supporting elements of the prior art. The containers tend to jiggle, and it has been found that this can cause heavy wearing of a stationary supporting element whereas the moving conveyors 20, 22 readily accept the container jiggling, and do not wear out as easily as the stationary supporting elements. Hence, no one segment of the conveyors 20, 22 is subject to continuous wear due to the high-speed transfer of containers from and back to the conveyor 14.

When the containers are moved past the idler star wheels 36, 38, they are guided by the rounded end portions 32, 34 of the container separator 26 to a timing star wheel mechanism 44, 46 associated with the second and third conveyors 20, 22 respectively. The timing star wheels 44, 46 operate in conjunction with the tapered nose portion 30 of the container separator 26 to produce the desired spacing and positionment of the containers 12 for subsequent return to the conveyor 14 in groups of closely spaced containers traveling two abreast.

As best seen in FIG. 2 of the drawing, the timing star wheels 44, 46 are symmetrical in construction and turn in opposite directions. Each star wheel 44, 46 defines a circumferential series of curvilinear pockets with star teeth 50 intervening between adjacent pockets 48. In comparison with the idler star wheels 36, 38, it will be seen that the pockets 48 more closely approximate a semicircular shape with the star teeth 50 having a generally claw-like shape affording minimum running clearance between adjacent containers engaged and moved by the star wheels 44, 46 respectively.

The star wheels 44, 46 are so located with respect to the second and third conveyors 20, 22 and the container separator 26 that containers are received within the curvilinear pockets 48 of each star wheel 44, 46 at approximately the tangent point of an imaginary circle defining the movement of each driven star wheel at the outer periphery thereof. This provides smooth, unimpeded transfer of containers to the star wheels 44, 46 without overloading the working parts so as to minimize container damage and wear of the operative mechanisms. The star wheels may be driven by any suitable mechanism, such as the pulley-belt arrangement 52 partially illustrated in FIG. 1 of the drawing. It is important that the star wheels be driven at the same speed and in synchronized relationship with respect to one another so that the pockets 48 of one star wheel will move in mirror image relationship with the pockets 48 of the other star wheel, but in opposite directions.

As the containers reach the rotatably driven timing star wheels 44, 46, they are moved into a respective pocket 48 thereof. Rotation of the star wheels 44, 46 will carry the containers received thereby from its respective conveyor back to the first conveyor 14, and during this operation, the containers 12 will be guided by the curvilinear sides adjacent the tapered nose portion 30 of the container separator 26, thereby avoiding excessive stressing or excessive jarring of the containers.

The above described operation of the star wheels 44, 46 in conjunction with the container separator 26 will move containers 12 past the tapered nose portion 30 defining the outlet station of the container handling apparatus 10 in the manner illustrated in the drawing with the containers arranged in closely spaced groups or pairs of containers traveling two abreast. After leaving the outlet station, the containers will be maintained in the desired arrangement due to their close spacing and the location of the side rails 18 which engage the double file procession of containers issuing from the container handling apparatus 10. The containers may now be transported to a container pack forming machine of the type illustrated in the aforementioned patents where two or more containers are assembled together as a packaging unit.

A modified form of the invention is depicted in FIGS. 3–4 of the drawings, and similar reference numerals will be employed with the suffix "a" used to designate like parts corresponding to the FIGS. 1–2 apparatus. The principal distinguishing feature of the apparatus shown in FIGS. 3–4 of the drawings is the location of the idler star wheels 36a, 38a relative to the other parts of the apparatus. As shown in FIGS. 3–4, the idler star wheels 36a, 38a are positioned in close proximity to one another immediately below the container separator 26a generally in the central section thereof. Idler star wheel 38a is spaced above and slightly overlaps idler star wheel 36a as best seen in FIG. 4 of the drawings so that they may operate in close proximity to one another without actual interference therebetween.

It will also be noted that the idler star wheels 36a, 38a are positioned slightly downstream of the FIGS. 1–2 embodiment, and this together with the location of the idler star wheels in the FIGS. 3–4 embodiment, require the container guides 16a to be lengthened to prevent the containers from falling off the conveyors 20a, 22a before reaching the timing star wheels 44a, 46a. As readily depicted in FIG. 3 of the drawings, the container side rails 16a overlie the conveyors 20a, 22a and terminate just short of the timing star wheels 44a, 46a to assure unimpeded transfer of the containers in the manner desired.

In actual practice, the container side rails 16 and 16a may be attached to side rails 18 and 18a becoming an integral part thereof, and offering a continuous closed path.

Other variations in the FIGS. 3–4 embodiment include the lengthening of the container side rails 18a and the tapered nose portion 30a of the container separator 26a. These modifications will provide guidance of the containers as they are returned from the conveyors 20a, 22a through the timing star wheels mechanism 44a, 46a to the conveyor 14a. The curved-in portions of the container side rails 18a also act as a stripping mechanism for removing the containers 12a from the pockets 48a of the timing star wheels 44a, 46a.

The operation of the apparatus shown in FIGS. 3–4 of the drawings is similar to the FIGS. 1–2 embodiment in that the containers 12a are first transferred from the conveyor 14a by the container separator 26a to the second and third conveyors 20a, 22a. Line pressure forces the separated rows of containers past the idler star wheels 36a, 38a which serve as a gate mechanism for permitting the passage of containers to the timing star wheels 44a, 46a which are driven in synchronous relationship with each other to convert the disorganized array of containers into a double file procession of containers traveling two abreast.

Various other modifications of the present invention, as exemplified by the FIGS. 3–4 embodiment, are, of course, possible. For example, the conveyor 14 may consist of two adjacent conveyor belts instead of the single conveyor belt shown, and such is within the purview of the present invention. Such modifications are to be considered in an exemplary sense only, and should not be considered as restricting the scope of the present invention as defined in the claims.

It will now be appreciated that the present invention contemplates an improved container handling apparatus which is extremely simple in construction, and which operates with efficiency to accept containers issuing from high-speed container filling and closing equipment, arranges the containers in a double file procession traveling two abreast, and transports the containers in the desired arrangement from the handling equipment, all without damaging the containers or overstressing the operating mechanisms of the handling equipment. The handling equipment of the present invention eliminates the need for magnetic separators associated with the timing star wheel mechanism which has been used by prior art apparatus since it effectively accomplishes the transfer and orientation of containers assuring positive engagement of the containers in the pockets of the star wheels as previously described.

Although a specific embodiment of the invention has been shown and described, it is with full awareness that many modifications thereof are possible. The invention is thus not, therefore, restricted except insofar as is necessitated by the prior art and by the spirit of the appended claims.

What is claimed is:

1. Container handling apparatus for transforming an incoming randomly positioned procession of containers into a double file procession of containers traveling two abreast comprising, first conveyor means for transporting the randomly positioned procession of containers along a first path, second and third conveyor means positioned closely adjacent to said first conveyor means on opposite sides thereof and being coplanar therewith for receiving containers from said first conveyor means at an inlet station and for returning containers to said first conveyor means at an outlet station, said second and third conveyor means being driven at a faster rate of speed than said first conveyor means, container separator means positioned directly above said first conveyor means at the inlet station for directing the randomly positioned procession of containers from the first conveyor means onto the second and third conveyor means, and means for correlating the speed and spacing of each group of containers on said second and third conveyor means and for thereafter returning the correlated containers to said first conveyor means at the outlet station in closely spaced groups of containers traveling two abreast.

2. The apparatus as defined in claim 1 and including gate means at said inlet station cooperating with said container separator means to permit non-jamming transfer of containers from said first conveyor means to said second and third conveyor means.

3. The apparatus as defined in claim 2 wherein said gate means comprises an idler star wheel for each of said second and third conveyor means, each idler star wheel having a plurality of pockets complementary to the shape of the containers received thereby for smooth, uninterrupted transfer to said second and third conveyor means.

4. The apparatus as defined in claim 1 wherein each of said conveyor means comprises an endless belt having guide means associated therewith to assure continuous transfer of all containers delivered thereto.

5. The apparatus as defined in claim 1 wherein said container separator means comprises a fixed plate element having curvilinear guide portions at both the inlet and outlet stations facilitating the transference of containers from and the return to said first conveyor means.

6. The apparatus as defined in claim 1 wherein said means for correlating the speed and spacing of each group of containers on said second and third conveyor means comprises a pair of rotatably driven star wheels oppositely positioned with respect to one another and cooperating with the container separator means at the outlet station for issuing containers therefrom in groups of containers traveling two abreast.

7. The apparatus as defined in claim 6 wherein the rotatably driven star wheels are positioned with respect to the container separator means at the inlet station thereof to receive containers at approximately the tangent point of the imaginary circle defining the movement of each rotatably star wheel at the outer periphery thereof.

References Cited

UNITED STATES PATENTS

| | | | |
|---|---|---|---|
| 3,032,944 | 5/1962 | Hull et al. | 53—128 X |
| 3,204,386 | 9/1965 | Creed et al. | 53—48 |
| 3,245,196 | 4/1966 | De Shazor et al. | 53—48 X |

EVON C. BLUNK, *Primary Examiner.*

R. J. HICKEY, *Assistant Examiner.*